INVENTOR:
Percy George Tacchi

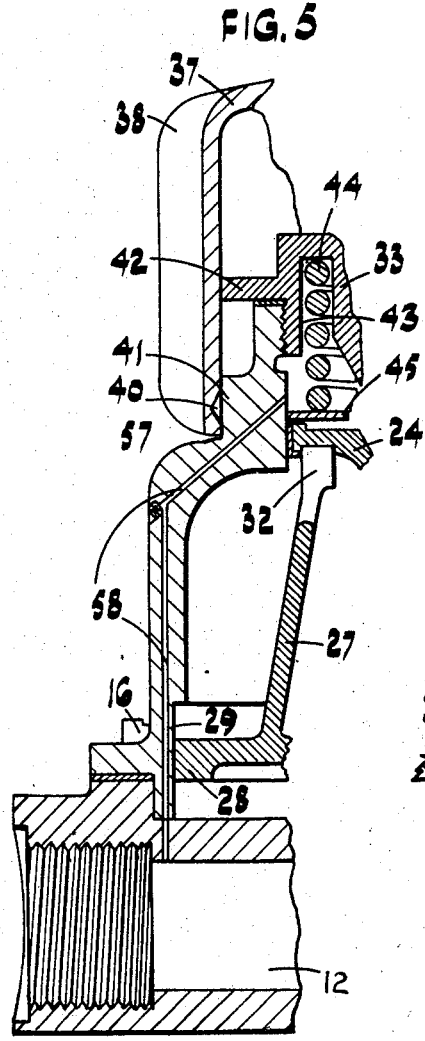
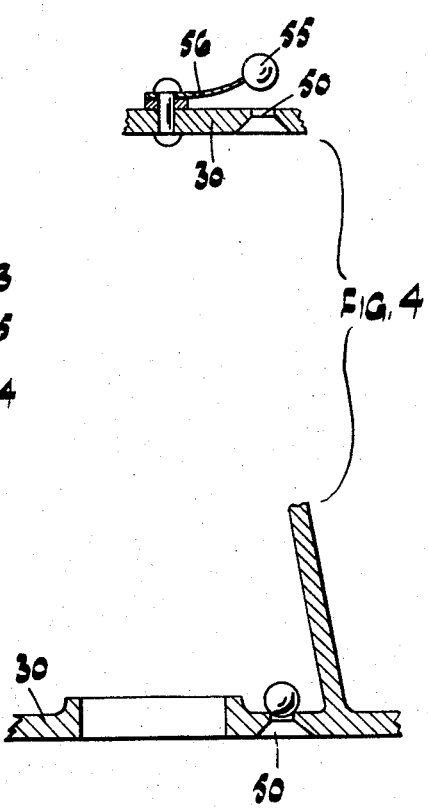

United States Patent Office 2,903,009
Patented Sept. 8, 1959

2,903,009

VALVES FOR MIXING FLUIDS AT DIFFERENT TEMPERATURES

Percy George Tacchi, Longs, North Curry, Taunton, England

Application September 7, 1956, Serial No. 608,447

Claims priority, application Great Britain January 12, 1956

6 Claims. (Cl. 137—100)

This invention relates to a valve for mixing together two fluids at differing temperatures. The most common use of such a mixing valve is in the production of hot water by mixing together steam (or hot water) and cold water and hereinafter, in order to simplify terminology, reference is made solely to steam as the fluid of higher temperature and cold water as the fluid of lower temperature but it will be readily appreciated that a valve according to the invention is capable of use with other fluids and, in particular, hot water may take the place of steam. Hitherto, mixing valves have generally been provided with a temperature responsive device such as a bi-metal strip or coil for controlling the proportionate flow of fluids through the valve in order to provide a constant temperature mixture delivery from the valve. Such valves have been found not to be entirely satisfactory in operation and one of the principal drawbacks in such valves is due to the delicate and unstable nature of the bi-metal element or coil which may be easily overstrained and which is costly to replace.

The object of the present invention is to provide a novel form of mixing valve which is of a more robust and reliable character than mixing valves hitherto and which does not rely, for its operation, upon the functioning of a temperature-responsive element.

According to the present invention I provide a valve for mixing together steam and cold water to produce hot water, comprising a valve body having steam and cold water inlets, a mixing chamber within the valve body provided with an outlet for the hot water, a piston or diaphragm mounted operatively within the body and having one side thereof exposed to the pressure within the mixing chamber, said piston or diaphragm being operatively connected with a valve controlling the flow of steam through the inlet into the mixing chamber whereby operative movement of the piston or diaphragm causes opening or closing movement of said valve according to the direction of movement of the piston or diaphragm and a passage of restricted cross-sectional area being provided between the cold water inlet and the mixing chamber through which passage cold water passes into the mixing chamber, the other side of the piston or diaphragm being subject to pressure prevailing on the upstream side of said restricted passage whilst the first mentioned side of the piston or diaphragm is subject to the pressure on the downstream side of the restricted passage whereby the piston is under the controlling influence of the differential pressure which exists between the ends of the restricted passage when water is flowing therethrough.

In order to reduce the possibility of excessive heat transference between the steam inlet passage and the residual water within the valve body when the valve is not in use, the interior or exterior (or both) of the steam inlet passage within the body of the valve may be fitted with a lining of heat insulating material.

This measure avoids the possibility of overheating the residual water to above a dangerous temperature which would lead to a sudden burst of hot water or steam from the valve when it is opened up. It also avoids the residual water being heated to a temperature at which deposition of lime might occur.

In most cases where hot water is being provided for washing and like purposes it will not be considered necessary to adjust for the small fluctuations in temperature of the mixture which might be brought about by variations in the pressure of the steam supply but in cases where a very steady temperature is required the following additional feature may be incorporated in order to counteract the effect of fluctuations in steam flow due to change in steam pressure.

According to this further feature the valve which controls the flow of steam into the mixing chamber is connected to a further piston operatively mounted within the valve body, one side of said piston being exposed to the pressure within the mixing chamber and the other side thereof being subject to the pressure prevailing in the steam inlet passage.

In order to explain the operation of the improved valve there is given hereinafter a more detailed description of certain valves incorporating the features of the present invention but it will be appreciated that the scope of the invention is not limited to the precise details given hereinafter which are to be taken as being by way of example and explanation.

In the examples illustrated in the accompanying drawings.

Figure 4 is two fragmentary views of a further modification.

Figure 5 is a fragmentary section illustrating another form of valve.

Figure 1:
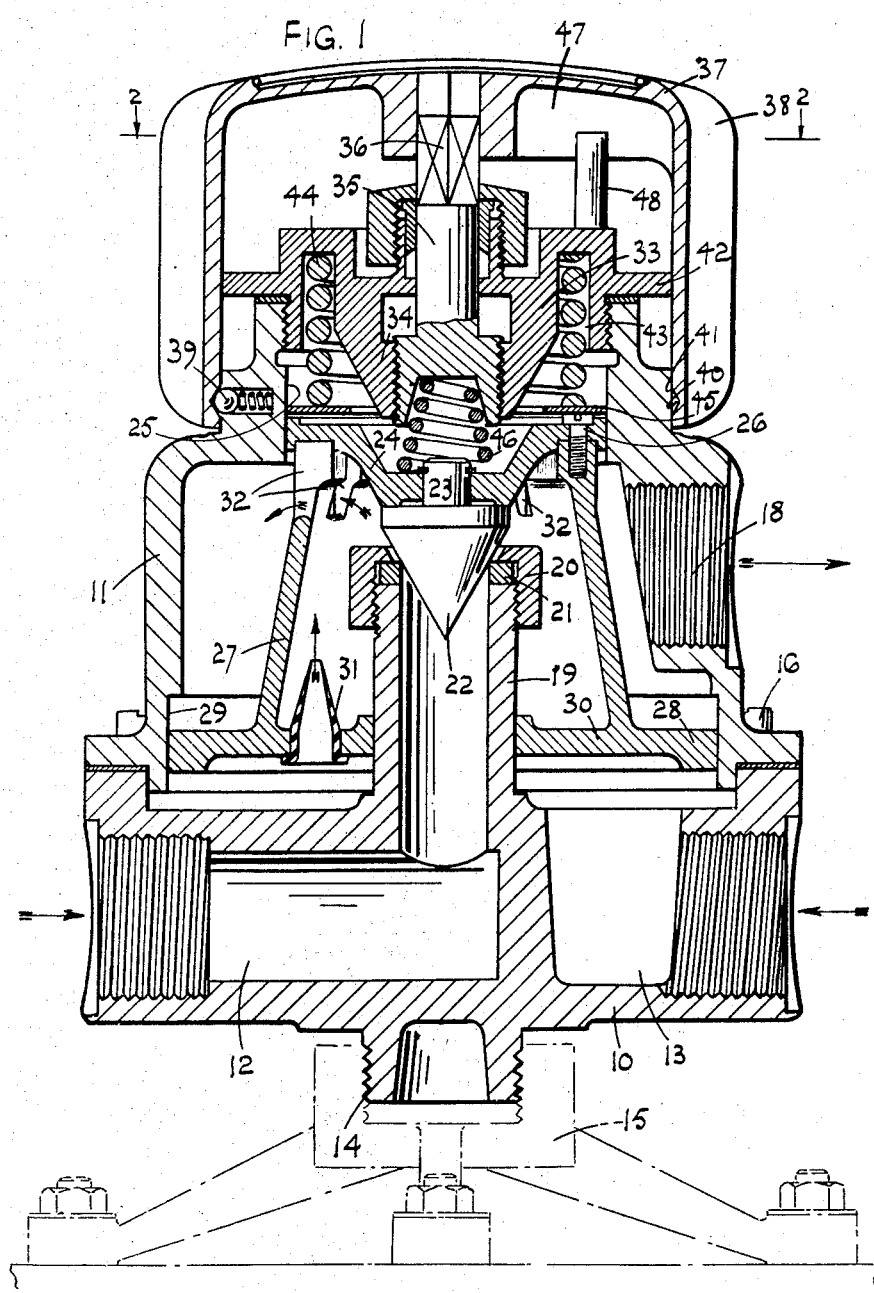
Figure 1 is a section through one form of valve.
Figure 2:
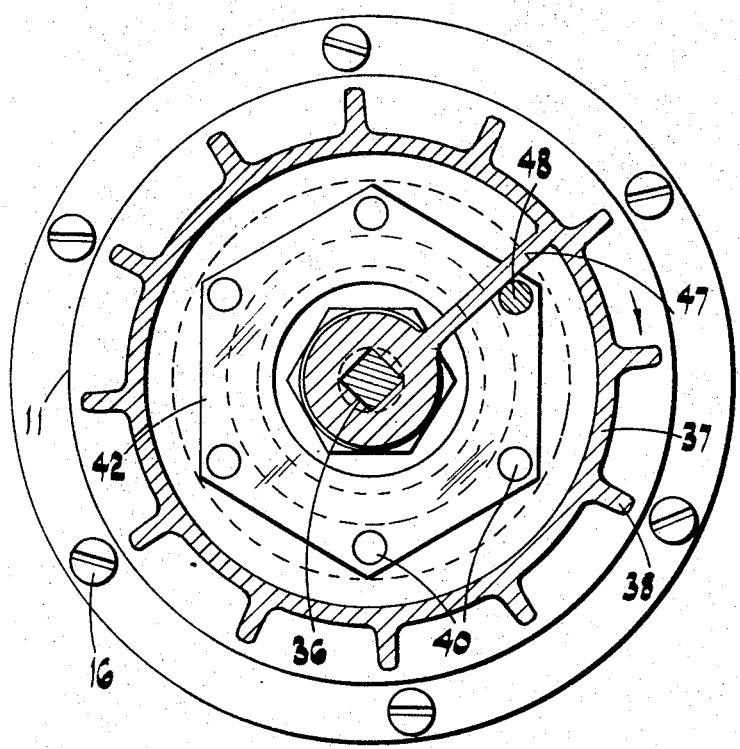
Figure 2 is a section on the line 2—2 in Figure 1.

Referring to Figures 1 and 2 the valve shown therein comprises a body which is made in two parts, a base part 10 and a mixing chamber 11, the base 10 having a steam inlet 12 and a cold water inlet 13. There may be more than one water inlet 13 which may be connected to separate cold water supplies or may be connected to a common supply. Each inlet is screwthreaded for engagement with the screwed end of a supply pipe.

On its underside the base 10 has a screwed boss 14 by means of which it is connected to a tripod support bracket 15 which can be secured to a wall or other support. It is a feature of this valve that it can be used in any position: vertical, horizontal or inclined as gravitational forces have no effect upon the working of the valve. In the drawings the valve is shown disposed vertically but this has been done to facilitate description as normally the bracket 15 would be mounted on a wall.

It will be observed that the base 10 of the valve can be adjusted rotationally upon the bracket 15 so as to enable existing steam and water supply pipes to be connected with the minimum of alteration.

The mixing chamber 11 is secured by screws 16 to the base 10 and it will be seen that the part 11 can be located in any desired one of a number of angular positions relatively to the base 10 in order that the outlet 18 from the mixing chamber can be positioned in the best position for connection to a pipe or pipes for supplying the hot water. More than one outlet 18 may be provided if desired.

The steam inlet passage 12 communicates at its inner end with a tube 19, formed integrally with the base 10 and extending axially therefrom, the outer end of the tube 19 having secured thereto, by means of a screwed cap 20, a valve seat 21. The interior of the tube 19 and passage 12 may be lined with heat resisting plastics material, or some similar heat insulating material to restrict transfer of heat from the steam, to the cold water or to the water which is left in the mixing chamber when the valve is not in use, this being for the purpose previously mentioned.

A conical valve member 22 co-operates with the seating 21, this valve member 22 being secured by its stem 23 to the underside of a disc-like cap 24 which is slidable within the circular opening 25 at the outer end of the mixing chamber. The cap 24 is secured by screws 26 to the upper edge of a trunk piston 27 having a radially extending flange or skirt 28 which is in sliding engagement with the wall 29 of an enlarged part of the interior of the mixing chamber.

The frusto-conical wall of the piston 27 ensures that none of the cold water can pass directly to the outlet 18 before it has had chance to mix with the steam from the tube 19. As the water flow is directed in a path parallel to the steam flow, the velocity of the steam tends to accelerate the flow of water.

Mounted in the base 30 of the piston is a jet or jets 31 which has a cross-section tapering from the cold water (or upstream) side of the piston to the mixing chamber (or downstream) side. This jet 31 constitutes the restricted passage in the cold water inlet path and in the form shown in Figure 1 the jet is made of rubber for a reason which is mentioned hereinafter.

At the upper edge the wall of the piston has a number of spaced slots 32 cut around its circumference to allow the hot water produced by the mixing of steam and cold water to pass out and through the outlet 18.

The outer end of the mixing chamber is closed by a screwed cap member 33 which has an inner hollow boss 34 in which is screwed the inner screwthreaded end of a spindle 35 provided at its outer end with a square section tang 36 upon which is mounted an operating knob 37 having radially projecting finger portions 38 which also assist in dissipating heat.

The knob is held upon the valve body by means of spring-loaded balls 39 engaging in an internal groove 40 in the wall of the knob and the knob is held steady relative to the body firstly by its engagement with the portion 41 and secondly by its engagement with a peripheral flange 42 on the cap member 33. Rotation of the knob 37 causes axial movement of the spindle 35. Any shock is transmitted to the body and not to the relatively weak spindle.

Spaced from the boss portion 34 of the cap member 33 is an integrally formed concentric wall 43, which has on its exterior the screwthread by means of which the cap is connected to the valve body. In the annular space so formed there is housed one end of a heavy compression spring 44 the other end of which bears on a washer 45 on the top of the piston cap 24 so that the spring 44 tends to keep the valve member 22 closed upon its seat.

At its inner end the spindle 35 is recessed and this recess houses one end of a light compression spring 46 the other end of which bears directly on the central part of the cap member 24.

When there is no demand upon the outlet 18 and hence no flow through valve, the spring 44 and spring 46 maintain the valve member 22 closed to cut off the steam supply but when there is some demand from the outlet, such as when a tap or taps are opened, cold water flow commences and the result of the flow through the jet 31, or jets if more than one is provided, is to create a differential pressure across the piston (30, 28) which, assisted by the kinetic energy of the water, raises the piston and thus opens the valve member 22 allowing steam to enter the mixing chamber. Increase in demand from the outlet 18, such as the opening of more taps, results in an increase in the cold water flow and consequent increase in the differential pressure across the piston so that the piston rises further and admits more steam to compensate for the increased flow of cold water. Slackening in the demand has the reverse effect and, finally, cessation of the demand allows the spring 44 to close the valve member 22 upon its seat.

The knob 37, spindle 35 and light spring 46 provide a means for adjusting the amount of full opening movement of the valve member 22 and hence adjustment of the maximum temperature which can be achieved for hot water delivered from the valve. With a left hand thread on the spindle 35, rotation of the knob in the anti-clockwise direction (Fig. 2) will compress the spring 46 and thus reduce the extent of opening movement of valve member 22 and decrease the value of the maximum temperature of the mixture, whilst rotation of the knob in the clockwise direction will have the opposite effect, i.e. increasing the maximum temperature.

It is desirable to place a limit on the maximum temperature which can be achieved by any one valve working under a given set of conditions and for this purpose the interior of the knob 37 has a radially extending web 47 which engages a pin 48 projecting upwardly from the outer face of the cap member 33 to limit the extent of anti-clockwise rotation of the knob. The position shown in the drawings is the maximum temperature position of the knob.

As shown in Figure 2 the upper face of the member 33 is hexagonal and at the corners thereof there are provided holes 40 in any desired one of which the pin 48 may be fixed. The fixing of the pin 48 would normally be done when the valve is first installed and the extent of rotation which is allowed the knob 37 by virtue of the positioning of the pin would be determined by the conditions under which the valve was to operate i.e. steam temperature and pressure, cold water pressure and extent and character of the potential demand at the outlet.

As previously mentioned the nozzle 31 (for each nozzle where there are more than one) is made of rubber which give it the characteristic of a variable throat section and this is primarily for the purpose of ensuring an adequate initial opening movement of the valve member 22 when the demand is low because it is found in practice that where, say, a battery of taps is being supplied and only one or two are opened so that the demand is small then the rate of flow of the cold water may not be sufficient to cause opening of the valve member 22 and consequently the mixture may be cold or tepid.

The rubber nozzle 31 can be formed so that when there is no flow therethrough the throat cross-section is at a minimum and will therefore give a substantial differential pressure across the piston for a low rate of flow of the cold water. As the flow of cold water increases due to increase in demand the resilient nature of the nozzle 31 allows the throat section to expand to a size more suitable to provide the pressure differential required when the valve is working on full or substantially full demand. The size and number of nozzles will be chosen to suit the size of valve and the potential demand.

Figure 3:
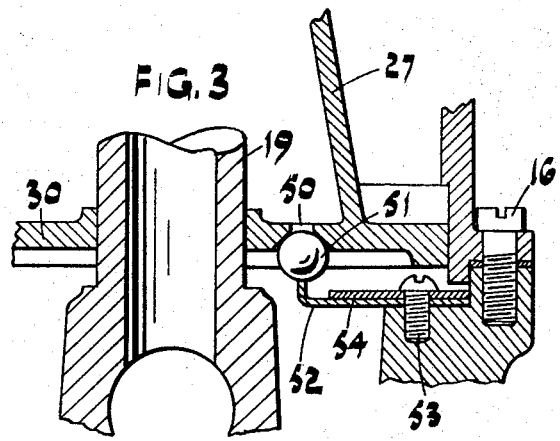
Figure 3 is a fragmentary sectional view of a modification.

An alternative arrangement to this is shown in Figure 3 where, instead of the nozzles 31, the piston base 30 is provided with two or more through passages 50 of restricted bore and one of these passages (being the one shown in Figure 3) is arranged so as to be closed by a ball valve 51 carried on the end of a spring arm 52 fixed to the valve base by a screw 53 which limits the upward movement of the arm 52. The ball valve 51 is arranged to close the one passage 50 just before the piston reaches the lower limit of its travel so that for the first small part of the opening movement the passage 50 is closed and this produces the same effect as with the variable throat nozzle 31 above described. According to the size of valve and operating conditions two or more of the passages 50 may have a ball valve 52 associated therewith.

With the nozzle arrangement shown in Figure 1, the flexibility of the rubber allows also the nozzle to act as a valve in the event of the piston failing to reach the lower limit of its travel when all demand at the outlet has ceased (this might be caused by the presence of some foreign body below the piston). In this event, the pressure of the steam acting upon the exterior of the nozzle causes it to collapse and close the opening through the piston thus preventing any steam from entering the cold water inlet and also allowing full steam pressure to act on the top of the piston and assist the spring 44 to clear the obstruction.

When the alternate arrangement of Figure 3 is used, a similar safety arrangement may be provided by means of the device shown in Figure 4 wherein the or each passage 50 has a ball closure valve 55 disposed on the upper side of the piston base 30 and secured to a resilient arm 56 which is riveted to the base 30 and biased so that it normally occupies the position shown at the top of Figure 4. In the event of obstruction to the movement of the piston, steam flow and pressure act upon the ball 55 forcing it into the closed position shown at the bottom of Figure 4.

With either of these arrangements, together with the heavy closing spring 44 there is full provision to prevent any steam from escaping into the cold water inlet and hence no separate safety cut-off valve is necessary for the steam supply.

A further advantage with this form of the valve is that no sealing rings are required for the piston flange 28 or the piston cap 24. The piston cap 24 acts as a guide for the main piston 27 and also acts as a dampening device to preventing "hunting." In practice it is found that there is just sufficient leakage past the piston cap and the valve stem 23 to provide the fluid pressure behind the piston cap so that it can act as a dampener.

Where there are likely to be fluctuations in steam supply pressure a modified form of valve as shown in Figure 5 may be used. This form of valve is of the same construction as the one previously described with the exception that the piston cap 24 is fitted with a suitable form of sealing ring or rings 57 and a small bore passage 58 extending through the valve body provides a communication between the steam inlet and the upper side of the piston cap 24 which therefore acts as an auxiliary piston and any sudden increase in steam supply pressure which might cause unwanted opening of the valve 22 will act upon the piston cap 24 to add extra force tending to close valve 22 and thus counteracting the effect of increase in steam pressure.

What I claim then is:

1. A valve for mixing together steam and cold water to produce hot water comprising a valve body having an inlet for steam and an inlet for cold water, a mixing chamber of cylindrical form within said valve body having an outlet for the hot water, a tube extending centrally into said mixing chamber and having one end communicating with the steam inlet, a piston working within said mixing chamber and being slidably mounted upon the exterior of said tube, one side of said piston being exposed to the cold water inlet and the other side thereof being exposed to the interior of the mixing chamber, said piston having extending therethrough a passage of restricted cross-sectional area through which cold water passes into the mixing chamber, a valve seat provided on the other end of said tube within the mixing chamber, a valve member connected to said piston and adapted to engage said valve seat and spring means acting on said valve member tending to move it into engagement with said valve seat to cut off entry of steam into the mixing chamber.

2. A mixing valve according to claim 1 wherein said spring means comprises a relatively heavy compression spring and a relatively light compression spring both acting upon said valve member tending to maintain it in the closed position and means comprising an operating knob and spindle rotatably mounted in the valve body for varying the compression on the relatively light compression spring.

3. A mixing valve according to claim 1 wherein the piston is of hollow truncated form and disposed so as to surround said tube, there being a cap at the top of said piston, said valve member being secured to the underside of said cap so as to have operative engagement with said valve seat, said piston having a wall of frustro-conical form provided with openings therethrough to allow the steam and water mixture to pass to the outlet of the mixing chamber.

4. A mixing valve according to claim 1 wherein the restricted passage comprises a nozzle made of resiliently deformable material and wherein the piston is of hollow frustro-conical form, the nozzle being mounted in the base of the piston.

5. A mixing valve according to claim 1 having a further restricted passage extending through said piston and wherein there is provided a spring loaded ball valve adapted to operate to close said further passage a little before the piston reaches the limit of its travel in the direction which causes closure of said valve member.

6. A mixing valve according to claim 1 wherein the restricted passage is provided with a ball valve on the side of the piston adjacent the mixing chamber, said ball valve being spring loaded into the open position and being adapted to be closed by steam flow and pressure in the event of any obstruction to the closing movement of the piston.

References Cited in the file of this patent

UNITED STATES PATENTS

| | | |
|---|---|---|
| 2,211,058 | Guthmann | Aug. 13, 1940 |
| 2,317,717 | Bauman | Apr. 27, 1943 |
| 2,679,861 | Campbell | June 1, 1954 |
| 2,682,883 | Phillips | July 6, 1954 |
| 2,714,488 | Wangenheim | Aug. 2, 1955 |

FOREIGN PATENTS

| | | |
|---|---|---|
| 658,787 | Germany | Apr. 12, 1938 |